(12) United States Patent
Fuchigami

(10) Patent No.: US 8,223,842 B2
(45) Date of Patent: Jul. 17, 2012

(54) DYNAMIC IMAGE DECODING DEVICE

(75) Inventor: Ikuo Fuchigami, Fukuoka (JP)

(73) Assignee: Panasonic Corporation, Osaka (JP)

( * ) Notice: Subject to any disclaimer, the term of this patent is extended or adjusted under 35 U.S.C. 154(b) by 842 days.

(21) Appl. No.: 12/301,103

(22) PCT Filed: May 23, 2007

(86) PCT No.: PCT/JP2007/060531
§ 371 (c)(1),
(2), (4) Date: Nov. 17, 2008

(87) PCT Pub. No.: WO2007/136094
PCT Pub. Date: Nov. 29, 2007

(65) Prior Publication Data
US 2010/0061451 A1    Mar. 11, 2010

(30) Foreign Application Priority Data

May 24, 2006    (JP) ................................ 2006-143842

(51) Int. Cl.
*H04N 7/00*    (2011.01)
(52) U.S. Cl. ......... 375/240.12; 375/240.08; 375/240.14; 375/240.16
(58) Field of Classification Search ............. 375/240.01, 375/240.12, 130–153; 704/500–504
See application file for complete search history.

(56) References Cited

U.S. PATENT DOCUMENTS

| | | | |
|---|---|---|---|
| 6,040,879 A | 3/2000 | Park | |
| 6,415,055 B1 * | 7/2002 | Kato | 382/236 |
| 6,714,591 B1 * | 3/2004 | Katata et al. | 375/240.08 |
| 7,453,941 B1 * | 11/2008 | Yamori et al. | 375/240.15 |
| 7,515,635 B2 * | 4/2009 | Hagai et al. | 375/240.12 |
| 7,817,899 B2 * | 10/2010 | Kadono | 386/263 |
| 2001/0021272 A1 * | 9/2001 | Yamori et al. | 382/236 |
| 2003/0007692 A1 * | 1/2003 | Chujoh et al. | 382/233 |
| 2003/0227976 A1 | 12/2003 | Okada et al. | |
| 2006/0203912 A1 * | 9/2006 | Kodama | 375/240.16 |

FOREIGN PATENT DOCUMENTS

| | | |
|---|---|---|
| EP | 0 618 567 | 3/1994 |
| EP | 07-130104 | 5/1995 |
| JP | 0 618 567 | 3/1994 |
| JP | 07-111654 | 4/1995 |
| JP | 07-130104 | 5/1995 |
| JP | 08-163575 | 6/1996 |
| JP | 2004-064746 | 2/2004 |

OTHER PUBLICATIONS

Heiko Schwarz, Detlev Marpe, and Thomas Wiegand; Overview of the Scalable H.264/MPEG4-A V C Extension; Oct. 2006; IEEE International Conference; pp. 1-4.*

(Continued)

*Primary Examiner* — Edan Orgad
*Assistant Examiner* — Fahimeh Mohammadi
(74) *Attorney, Agent, or Firm* — Wenderoth Lind & Ponack, L.L.P.

(57) ABSTRACT

A moving image decoding device decodes moving image data encoded by a predictive encoding method. In decoding a block that has been encoded by an inter-screen predictive encoding, if a reference block is not stored in frame memory, the moving image decoding device decodes the block assuming that the block has been encoded by an intra-screen predictive encoding.

5 Claims, 10 Drawing Sheets

OTHER PUBLICATIONS

Heitou Zen, Tameharu Hasegawa, Shinji Ozawa; Moving Object Detection From MPEG Coded Picture; Date 1999; IEEE Image Processing; vol. 4; pp. 1-5.*

International Search Report issued Jun. 26, 2007 in the International (PCT) Application of which the present application is the U.S. National Stage.

International Preliminary Examination Report (ISA/409) issued Mar. 31, 2008 in the International (PCT) Application of which the present application is the U.S. National Stage.

Joint Video Team (JVT) of ISO/IEC MPEG & ITU-T VCEG Draft ITU-T Recommendation and Final Draft International Standard of Joint Video Specification.

* cited by examiner

PREDICTION MODE 0

PREDICTION MODE 1

PREDICTION MODE 2

PREDICTION MODE 3

PREDICTION MODE 4

PREDICTION MODE 5

PREDICTION MODE 6

PREDICTION MODE 7

PREDICTION MODE 8

000# DYNAMIC IMAGE DECODING DEVICE

BACKGROUND OF THE INVENTION

1. Technical Field

The present invention relates to an image decoding device that decodes encoded moving image data, and in particular to decoding technology for reproducing moving image data from halfway through.

2. Background Art

The recent demand for reproduction of an image with high quality on a large screen has increased the data size of an image, especially the data size of a moving image. Assuming, for example, a situation where such a moving image with ever-increasing data size has to be recorded on a recording medium, there have been developed technologies for compressing/encoding such a moving image.

Among highly efficient compressing/encoding technologies is the inter-screen predictive encoding technology that makes use of inter-screen correlations. The inter-screen predictive encoding technology is applied to the international standards of an encoding/compression method.

Examples of the international standards are: the MPEG (Moving Picture Experts Group)-2 standard that is intended to realize television broadcasting with a high image quality, ranging from traditional television broadcasting to high-definition television broadcasting; and the H.264/MPEG-4 AVC (Advanced Video Coding) standard that is intended to realize a high compression rate for mobile/internet use.

Generally, moving image data recorded on a recording medium is often reproduced not only from the start of its bitstream, but also from a mid-point of its bitstream. Also, with regard to a television broadcast, the television broadcast is reproduced from a mid-point of its bitstream, unless the television broadcast is viewed from the very beginning.

Basically, decoding moving image data that has been encoded using the inter-screen predictive encoding method requires use of other image data. This is because such moving image data is encoded in such a manner that only a difference between the moving image data and other image data is recorded, so that the moving image data is compressed with a high compression rate.

For this reason, for example, when the reproducing end receives and attempts to reproduce a bitstream of a television broadcast from halfway through, the reproducing end might not be able to reproduce images of the television broadcast if it has not received data of other images to be referred to (hereafter, "reference images").

In view of the above, there has been proposed technology for decoding and displaying images of moving image data even when the moving image data is reproduced from halfway through (see Patent Document 1). When there exist no reference images that are required for decoding, this technology performs the decoding by using other substitute images that have been prepared in advance (e.g., grayscale images) as substitutes for the originally required reference images.

Although not a technology intended to reproduce moving image data from halfway through, there has also been proposed technology for generating and displaying images even when image data, which is supposed to be decoded, cannot be read out due to an error or the like and hence cannot be decoded (see Patent Document 2).

Below is a brief explanation of the technology of Patent Document 2. When the image data to be decoded does not exist, this technology regards predicted images as images to be displayed. This technology is described in greater detail later, with reference to FIG. 11.

With use of the above-mentioned technologies, when moving image data cannot be decoded, the moving image data can be reproduced halfway through, although pre-encoded images thereof cannot be displayed.

Patent Document 1:
  Japanese Laid-Open Patent Application No. H8-163575
Patent Document 2:
  Japanese Laid-Open Patent Application No. H7-111654

However, the correlation between the stated substitute images, which have been prepared in advance as substitutes for the originally required reference images, and the originally required reference images is extremely small. Therefore, use of the substitute images will drastically decrease the reproducibility of the resulting decoded images, i.e., the degree of similarity between pre-encoded images and the resulting decoded images will be extremely low. Likewise, regarding the predicted images as the images to be displayed does not involve utilizing residual data that indicates a difference between the pre-encoded images and the reference images. Accordingly, use of this method will also drastically decrease the reproducibility of the resulting decoded images.

In light of the above, the present invention aims to provide a moving image decoding device that can, in reproducing moving image data from halfway through, generate decoded images with high reproducibility.

SUMMARY OF THE INVENTION

In order to achieve the above aim, the present invention provides a moving image decoding device for decoding moving image data encoded by a predictive encoding method, the moving image data being composed of a plurality of pictures that include blocks, the moving image decoding device comprising: a storage unit operable to store therein images obtained by decoding the blocks; a judgment unit operable to judge whether or not the reference image associated with a target block, which was referred to in encoding the target block, is stored in the storage unit, the target block being one of the blocks; and a control unit operable to, in a case where the target block has been encoded by an inter-screen predictive encoding method, perform control for: (i) when the judgment unit judges affirmatively, decoding the target block using the reference image associated with the target block; and (ii) when the judgment unit judges negatively, decoding the target block using at least one of the images obtained by decoding at least one of the blocks which is included in the same picture as the target block.

In decoding a block that has been encoded by the inter-screen predictive encoding method, the moving image decoding device with the above structure can decode the block by using an image of another block that is included in the same picture as the block, even when there exists no reference image. That is, the moving image decoding device can decode the block even before it begins the decoding of the next sequence. Here, each sequence constitutes one moving image stream; each sequence can be decoded without referring to a stream of another sequence.

Also, the block is decoded by (i) generating a predicted block in accordance with intra-screen correlations (i.e., generating a predicted block basically by using pixels that are adjacent to the target block), then (ii) adding this predicted block to residual data that has been originally included in the target block.

Although the pre-encoded image of the target block cannot be obtained as is, if the pre-encoded image of the target block closely resembles the pre-encoded image of a block that is adjacent to the target block, then there will be a higher possibility of decreasing the differences between the image obtained by decoding the target block and the pre-encoded image of the target block. Since images of blocks that are adjacent to each other are highly likely to resemble each other, the above structure is expected to increase the reproducibility of the target block.

The above moving image decoding device may further comprise a detection unit operable to detect that a predetermined one of the pictures has been decoded, wherein until the detection unit detects that the predetermined one of the pictures has been decoded, the judgment unit judges negatively.

When the predetermined one of the pictures has not been decoded yet, the moving image decoding device having the above structure decodes a block encoded by the inter-screen predictive encoding method by using an image obtained by decoding another block included in the same picture as the target block. This structure allows the moving image decoding device to start the decoding without having to wait for the next sequence.

Here, the predetermined one of the pictures is, for example, an IDR (Instantaneous Decoding Refresh) picture. That is to say, even when the moving image decoding device is to start the decoding from the mid-point of a sequence, it can start the decoding without waiting for an IDR picture of the next sequence. And since the moving image decoding device performs prediction by making use of intra-screen correlations, it can obtain a decoded image with higher accuracy.

The moving image decoding device may be structured such that in the case where the target block has been encoded by the inter-screen predictive encoding method, when the judgment unit judges negatively, the control unit performs control for (i) selecting, from among some of the blocks which are adjacent to the target block, at least one block encoded by an intra-screen predictive encoding method, and (ii) decoding the target block using at least one of the images obtained by decoding the selected at least one block.

The moving image decoding device having the above structure makes use of information (e.g., a pixel value) of a block that has been encoded by the intra-screen predictive encoding method. Therefore, this moving image decoding device can reduce effects of a block encoded by the inter-screen predictive encoding method, and is expected to be of greater advantage to improve the quality of a decoded image.

Note, a single screen is composed of a plurality of pixels and is encoded in units of one block, said one block being generated by, for example, encoding a group of 16-by-16 pixels that constitute a square-shaped image as a whole. The aforementioned some of the blocks which are adjacent to the target block denote blocks whose square edges are in contact with the edges of the target block.

The moving image decoding device may further comprises a correlation storage unit operable to store therein, in one-to-one correspondence with the images obtained by decoding the blocks, correlation information pieces each indicating a degree of similarity between pre-encoded image of the own block and the image obtained by decoding the own block, wherein in the case where the target block has been encoded by the inter-screen predictive encoding method, when the judgment unit judges negatively, the control unit performs control for (i) in accordance with the correlation information pieces, selecting, from among the images obtained by decoding some of the blocks which are adjacent to the target block, the image having a higher degree of similarity to the corresponding pre-encoded image than the rest, and (ii) decoding the target block using the selected image.

As the moving image decoding device uses information (e.g., a pixel value) of a block that has a higher degree of reproducibility, it can reduce effects of a block encoded by the inter-screen predictive encoding method, and is expected to be of greater advantage to improve the quality of a decoded image.

DESCRIPTION OF CHARACTERS

10,50 moving image decoding device
1000 various-length decoding unit
2000 inverse quantization and inverse orthogonal transformation unit
3000 addition unit
4000 in-loop filtering unit
5000 frame memory
6000 decode control unit
6100 reference image selection subunit
6200 predicted block selection subunit
7000 IDR flag
8000 intra-screen predicted block generation unit
9000 inter-screen predicted block generation unit Detail Description of the Invention <Embodiment 1>
<Overview>

Assume that a moving image decoding device of the present invention is attempting to reproduce a bitstream from halfway through. When frame memory does not store therein a reference image for a target block that has been encoded by inter-screen predictive encoding, the stated moving image decoding device generates a display image by performing decoding processing using intra-screen predictive decoding.

Normally, a block that has been encoded by the inter-screen predictive encoding should be decoded by inter-screen predictive decoding, and a reconstructed image should be generated with use of a predicted image and residual data, the predicted image being generated with use of a reference image.

However, as the present invention is implemented under an assumption that there exists no reference image, the moving image decoding device of the present invention generates a reconstructed image with use of a predicted image and residual data, the predicted image being generated using intra-screen prediction.

The reason why the intra-screen prediction is used is because (i) a pre-encoded image of the target block is supposed to have a high degree of similarity to any of pre-encoded images of blocks that are adjacent to the target block, and (ii) using the residual data of the target block increases the possibility of generating a decoded image with higher accuracy.

Also, in decoding blocks that have been encoded by inter-screen predictive encoding, the moving image decoding device of the present invention uses its functional components that normally perform intra-screen predictive decoding. Accordingly, the moving image decoding device of the present invention has the benefit of not having to necessitate any special functional components.

The following describes a moving image decoding device pertaining to Embodiment 1 of the present invention, with reference to the accompanying drawings. Note, the present Embodiment will be described below under an assumption that moving image data to be decoded has been generated in conformity with the H.264/MPEG-4 AVC standard.

<Functions>

Figure 1:
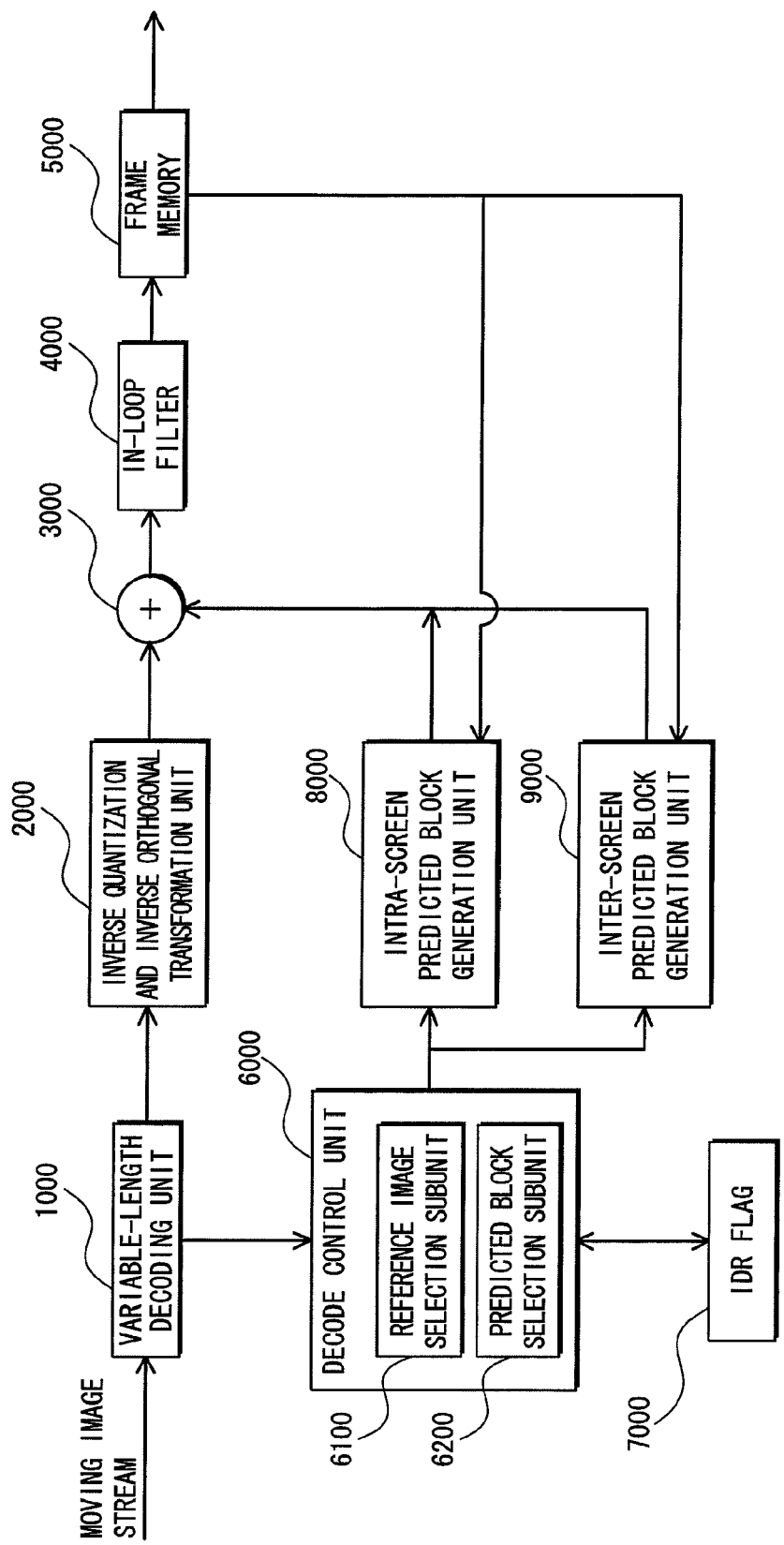
FIG. 1 is a block diagram showing the structure of a moving image decoding device 10 pertaining to Embodiment 1.

FIG. 1 is a block diagram showing the structure of a moving image decoding device 10.

The moving image decoding device 10 includes: a variable-length decoding unit 1000; an inverse quantization and inverse orthogonal transformation unit 2000; an addition unit 3000; an in-loop filter 4000; frame memory 5000; a decode control unit 6000; an IDR flag 7000; an intra-screen predicted block generation unit 8000; and an inter-screen predicted block generation unit 9000.

The functional components of the moving image decoding device 10 are fundamentally the same as those of a conventional decoding device. The only difference is that the moving image decoding device 10 additionally includes the decode control unit 6000 and the IDR flag 7000 for performing processing unique to the present invention.

First, once a code string of a moving image that has been encoded according to the MPEG-4/AVC format (hereafter, "moving image stream") is input from outside to the variable-length decoding unit 1000, the variable-length decoding unit 1000 performs variable-length decoding and detach slice types, macroblock types, motion information, quantized coefficients or the like, from each other. After the detachment, each slice type, macroblock type, motion information or the like is output to the decode control unit 6000. Each quantized coefficient is output to the inverse quantization and inverse orthogonal transformation unit 2000.

The inverse quantization and inverse orthogonal transformation unit 2000 obtains residual data of a pixel of each block by subjecting the quantized coefficient of each block to inverse quantization and inverse orthogonal transformation.

Depending on a type of encoding that is shown by each macroblock type, the addition unit 3000 outputs pixel data of each block either (i) unmodified or (ii) with a prediction signal added thereto, the prediction signal being output by the intra-screen predicted block generation unit 8000 or the inter-screen predicted block generation unit 9000.

The in-loop filter 4000 generates a decoded image by performing filtering processing (e.g., deblock filtering for reducing distortions on/around the borders of the blocks) on each image output by the addition unit 3000, and then outputs the generated decoded image.

The frame memory 5000 accumulates therein the image output by the in-loop filter 4000 and transmits this image to a display unit (not illustrated). The frame memory 5000 also accumulates therein, in units of one screen, pixel data to be used as a reference image.

With use of a prediction mode or the like obtained from the decode control unit 6000 and a reference image accumulated in the frame memory 5000, the intra-screen predicted block generation unit 8000 obtains a prediction signal of a block that has been encoded by the intra-screen predictive encoding. The intra-screen predicted block generation unit 8000 then outputs the obtained prediction signal to the addition unit 3000. In the present Embodiment, under the control of the decode control unit 6000, a block that has been encoded by the inter-screen predictive encoding is assumed to be a block that has been encoded by the intra-screen predictive encoding. The prediction signal is generated under such an assumption.

With use of motion information obtained from the decode control unit 6000 and a reference image accumulated in the frame memory 5000, the inter-screen predicted block generation unit 9000 obtains a prediction signal of a block that has been predicted by motion compensation prediction. The inter-screen predicted block generation unit 9000 then outputs the obtained prediction signal to the addition unit 3000.

The decode control unit 6000 includes a reference image selection subunit 6100 and a predicted block selection subunit 6200. The decode control unit 6000 has the function of causing either the intra-screen predicted block generation unit 8000 or the inter-screen predicted block generation unit 9000 to generate a prediction signal for the target block (hereafter, "predicted block") based on the corresponding slice type, macroblock type and motion information output by the variable-length decoding unit 1000.

The reference image selection subunit 6100 has the function of selecting a reference block to be used when decoding the target block by the intra-screen predictive decoding. If there exists no reference block when attempting to decode a block that has been encoded by the inter-screen predictive encoding, the reference image selection subunit 6100 selects a reference block that is used to perform the intra-screen predictive decoding.

The predicted block selection subunit 6200 has the function of, with reference to the IDR flag 7000, judging whether the predicted block should be generated by the intra-screen predicted block generation unit 8000 or the inter-screen predicted block generation unit 9000.

The IDR flag 7000 is a flag indicating whether or not an IDR picture in a moving image stream has been decoded yet. The IDR flag 7000 is provided in, for example, a register.

When the IDR flag 7000 is "ON", it means that the IDR picture has been decoded. When the IDR flag 7000 is "OFF", it means that the IDR picture has not been decoded yet.

When the IDR flag 7000 is "ON", the predicted block selection subunit 6200 judges that the predicted block can be generated in the inter-screen predicted block generation unit 9000. This is because when the IDR picture has been decoded, it means that the reference picture has been decoded as well.

Below are a description of an IDR picture with reference to FIG. 2, a brief description of a moving image stream with reference to FIG. 3, and a brief description of intra-screen predictive encoding with reference to FIGS. 4 and 5.

<IDR Picture>

Figure 2:
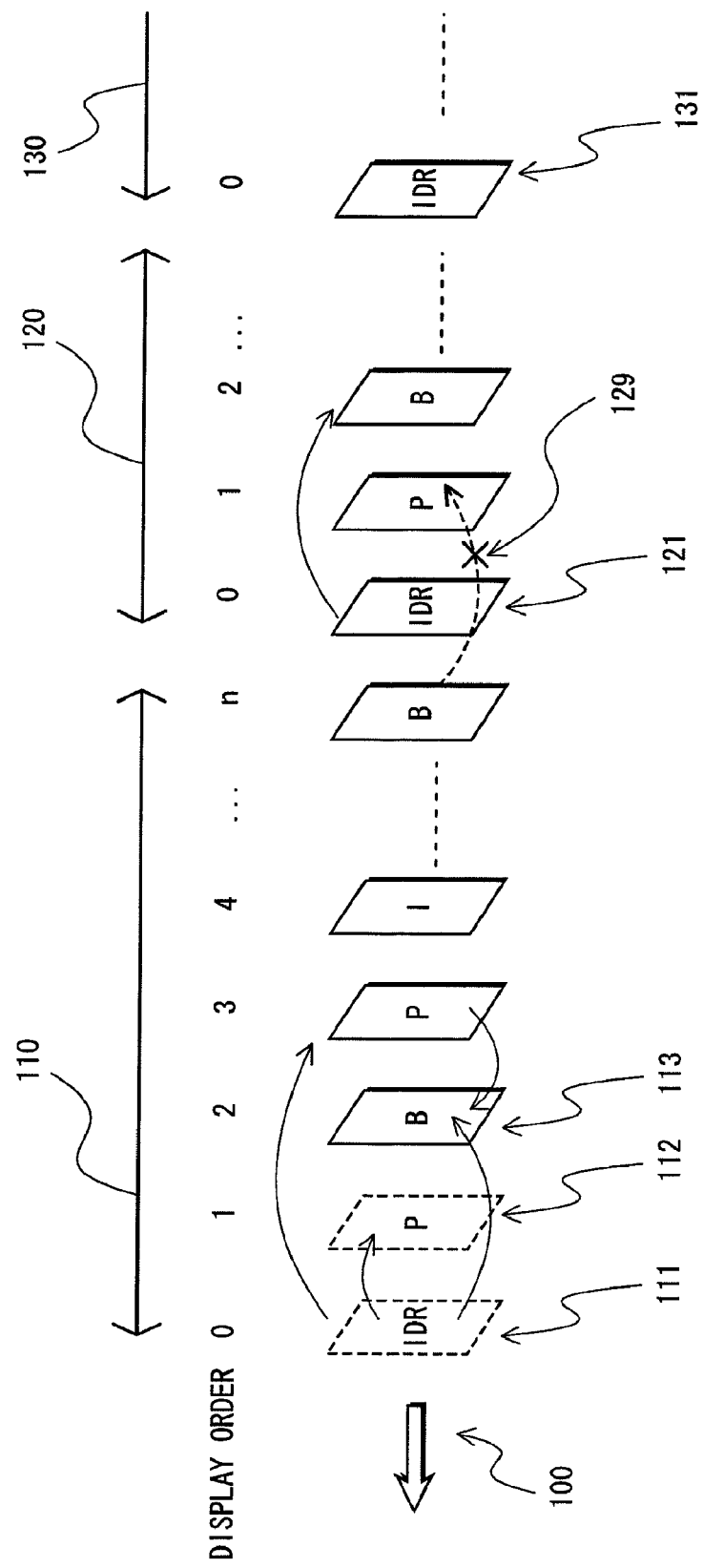
FIG. 2 shows a relationship between a moving image stream and an IDR picture.

FIG. 2 shows a relationship between a moving image stream and the IDR picture.

Each rectangle represents a picture. "IDR", "I", "P", and "B" indicated in these rectangles represent picture types (i.e., "IDR picture", "I picture", "P picture", and "B picture").

Each rectangle outlined with dotted edges represents a picture that could not be received (111 and 112).

Each solid arrow indicates a reference relationship. For example, a picture 113 refers to a picture 111 and a P picture that follows the picture 113.

According to the standard, in order to allow reproducing the moving image stream 100 from halfway through, certain image data should be provided as separators at regular intervals within the moving image stream 100, so that image data following the certain image data can be accurately decoded without having to use image data that precedes the certain image data.

More specifically, the certain image data provided as separators are the IDR pictures (111, 121 and 131). Each of these IDR pictures, which is one type of an I picture, restricts pictures that come after itself from referring to pictures that precede itself. In other words, it is not permitted for any picture to refer to a picture preceding an IDR picture by bypassing the IDR picture (a dotted arrow 129).

A moving image stream section that begins with one IDR picture and ends with a picture provided right before the next IDR picture is referred to as a sequence (110, 120 and 130).

As set forth, the moving image stream can be reproduced from a mid-point thereof (e.g., from the IDR picture 121). However, the moving image stream cannot be reproduced from a mid-point of a sequence that begins with an unreceived IDR picture (e.g., from the IDR picture 113). In contrast, the present invention can display the moving image stream with high reproducibility, even from the picture 113.

<Moving Image Stream>

Figure 3:
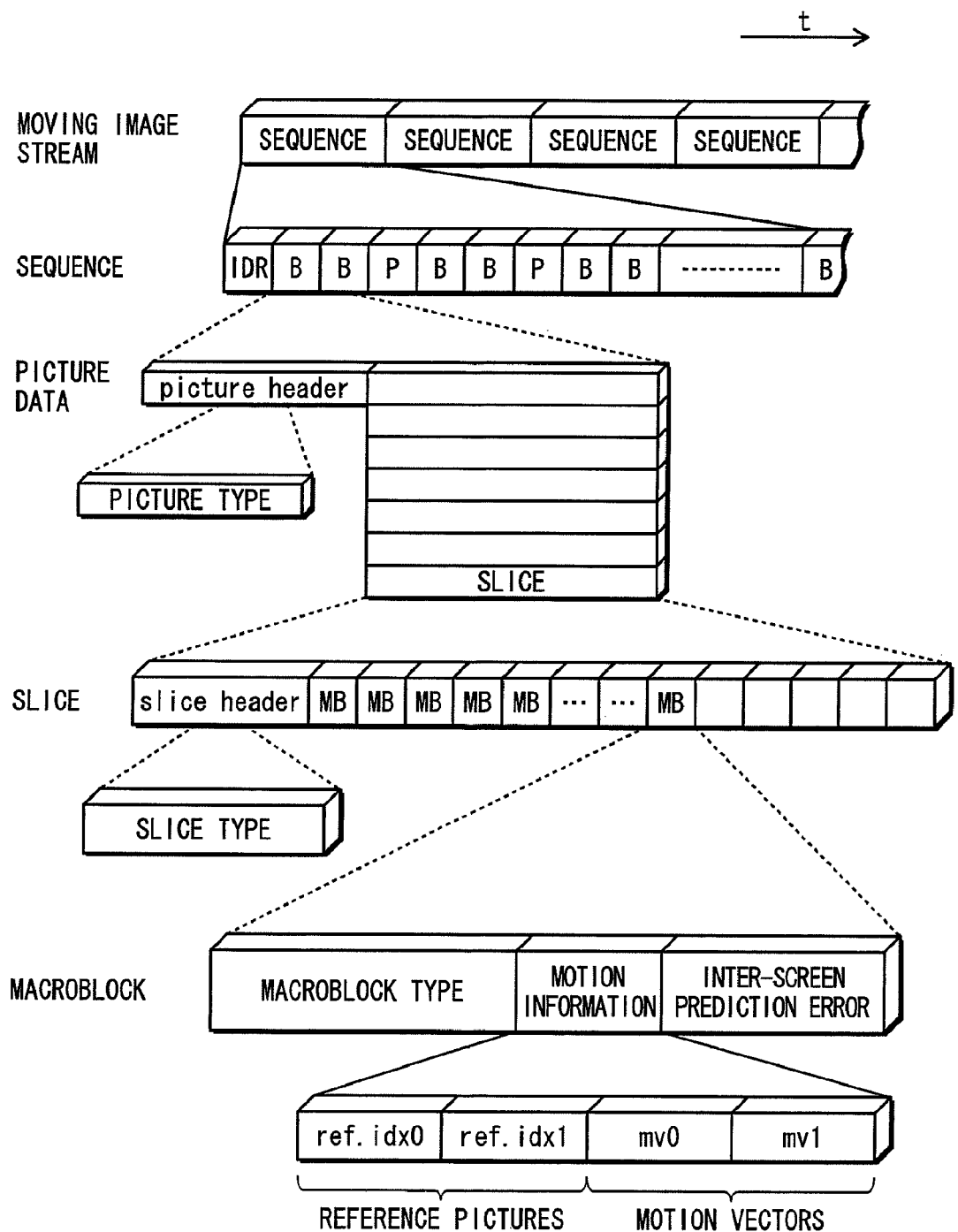
FIG. 3 shows the data structure of the moving image stream.

FIG. 3 shows the data structure of the moving image stream.

The moving image stream is compressed based on spatial frequency components of an image. The compression is performed in units of several pixels on a screen. Each unit of several pixels is referred to as a macroblock. Accordingly, the screen is composed of a plurality of macroblocks.

Each macroblock is made up of, for example, 16-by-16 pixels. The moving image stream is thereby decoded in units of one macroblock.

FIG. 3 also shows the structure of the moving image stream.

The moving image stream is composed of a plurality of sequences (see the first row of FIG. 3), and includes three types of picture data, i.e., an I picture, a B picture, and a P picture (I, P and B in FIG. 3). Here, the number of each picture (I, B and P) is at least one. Each sequence always begins with an IDR picture, which is one type of the I picture (see the second row of FIG. 3).

Furthermore, each picture data is composed of a picture header and a plurality of slices (see the third row of FIG. 3), the picture header including a picture type. This picture type indicates whether the corresponding picture data is an I picture, a B picture, or a P picture.

It should be noted that, in the MPEG-4/AVC format, the picture header does not include the picture type itself, but instead includes types of slices included in the corresponding picture. Accordingly, the picture type of the corresponding picture can be obtained from the slice types.

Each slice is composed of a slice header and a plurality of macroblocks (see the fourth row of FIG. 4), the slice header including a slice type. This slice type indicates whether the corresponding slice data is an I slice, a B slice, or a P slice.

In reality, each slice is stored in a format called an NAL unit, and the moving image stream is composed of a plurality of NAL units. Embedded at the start of each NAL unit is an NAL unit type indicating a type thereof. Whether or not the corresponding slice belongs to an IDR picture can be identified from each NAL unit type (see Joint Video Team (JVT) of ISO/IEC MPEG & ITU-T VCEG, "Draft ITU-T Recommendation and Final Draft International Standard of Joint Video Specification (ITU-T Rec. H.264|ISO/IEC 14496-10 AVC)": Section 7.4).

Each macroblock is composed of a macroblock type, motion information, an inter-screen prediction error (residual data) or the like.

The macroblock type shows information indicating whether or not this macroblock is required for inter-screen prediction, whether the reference is performed in a one-way reference or a two-way reference, and the like. Depending on the macroblock type, the format of the motion information varies. More specifically, an I slice is composed of blocks of a non-reference type and an intra-screen prediction type. A P slice is composed of the aforementioned components of the I slice and blocks of a one-way inter-screen prediction type. A B slice is composed of the aforementioned components of the P slice and blocks of a two-way inter-screen prediction type.

The motion information is composed of a reference picture, which identifies a picture to be referred to, and a motion vector.

The motion information exemplarily shown in FIG. 3 is of a two-way reference. Each of "ref.idx0" and "ref.idx1" represents a number indicating a corresponding reference picture. Each of "mv0" and "mv1" indicates a motion vector of the corresponding reference picture.

Based on information such as the above-described slice types and macroblock types, the decode control unit 6000 judges whether a predicted block should be generated by the intra-screen predicted block generation unit 8000 or the inter-screen predicted block generation unit 9000.

<Intra-Screen Predictive Encoding>

Figure 4:
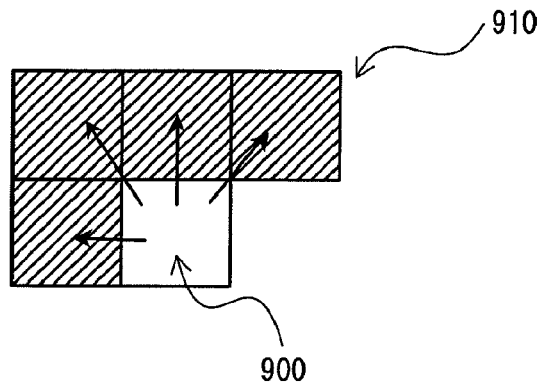
FIG. 4 shows blocks to which a target block refers in performing intra-screen predictive encoding.

FIG. 4 shows blocks to which a target block refers in performing the intra-screen predictive encoding.

Referring to FIG. 4, each square represents a different one of blocks. Hatched squares are assumed to be reference blocks (blocks to be referred to) 910. Here, what are actually referred to are images generated by decoding these reference blocks.

A target block 900 generates a predicted block with reference to at least one of the four blocks that are located to the left, to the upper left, above, and to the upper right of itself. More specifically, the target block 900 generates a predicted block with reference to at least one of pixel values obtained from the borders of one to three blocks selected from these four blocks.

It should be noted here that each macroblock may be made up of 16-by-16 pixels, 4-by-4 pixels, and so on.

Figure 5:
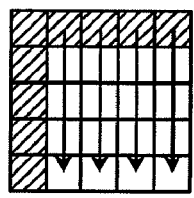
FIG. 5 shows the mechanism of intra-screen encoding in a case where each macroblock is made up of 4-by-4 pixels.
Figure 5:
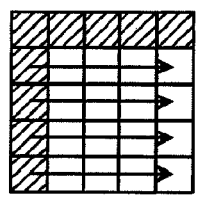
Figure 5:
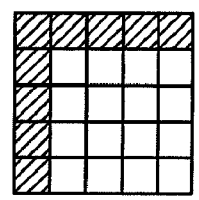
Figure 5:
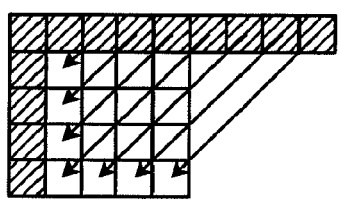
Figure 5:
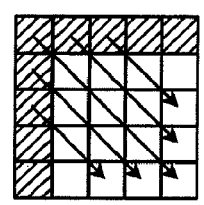
Figure 5:
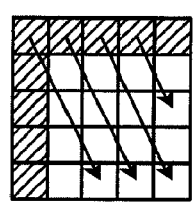
Figure 5:
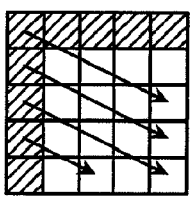
Figure 5:
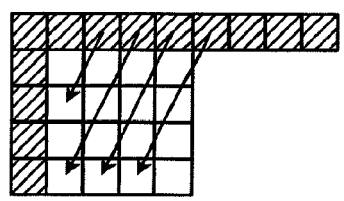
Figure 5:
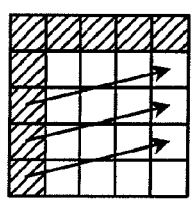

FIG. 5 shows the mechanism of intra-screen encoding in a case where each macroblock is made up of 4-by-4 pixels.

Referring to FIG. 5, each square represents a different one of pixels. Hatched squares represent pixels to be referred to as being included in the blocks adjacent to the target block. Also, the pixel values are assumed to be predicted values of the pixels that are aligned in the directions of the arrows.

Nine predict ion methods are shown in FIG. 5. They are referred to as prediction modes 0 to 8.

In decoding the target block, the moving image decoding device 10 of the present invention sets the best suited prediction mode depending on a block to be referred to.

<Operations>

Figure 6:
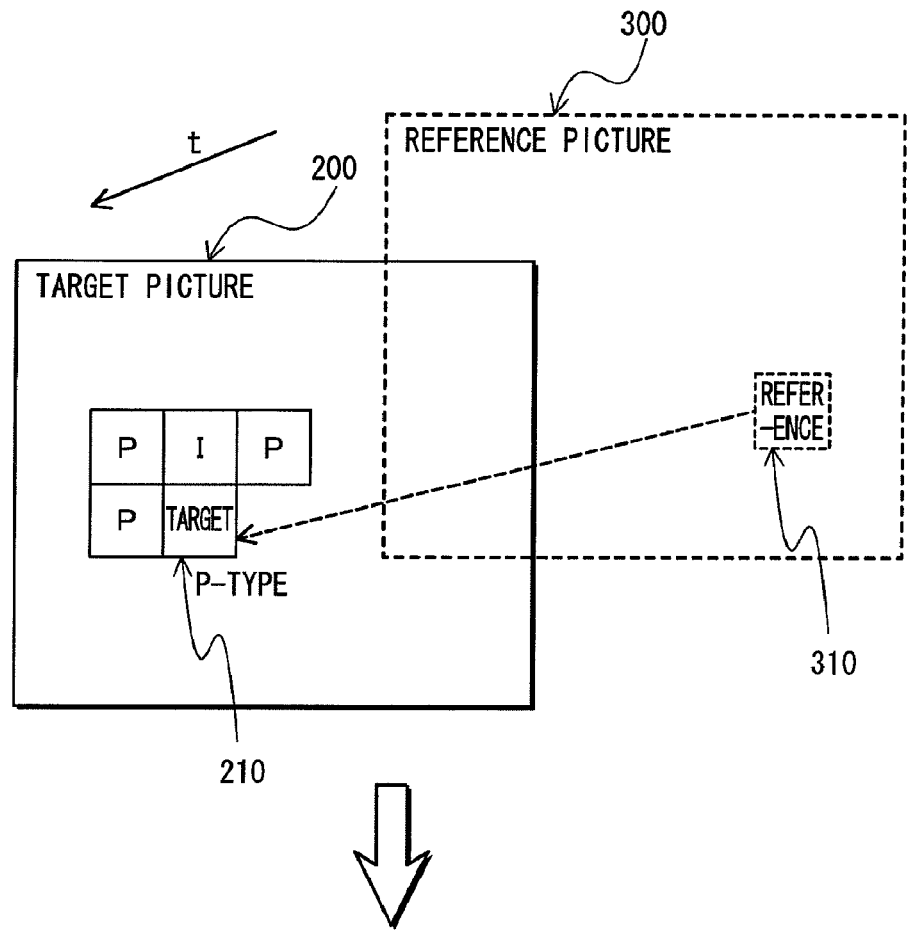
FIG. 6 shows an outline of decoding processing performed in Embodiment 1.
Figure 6:
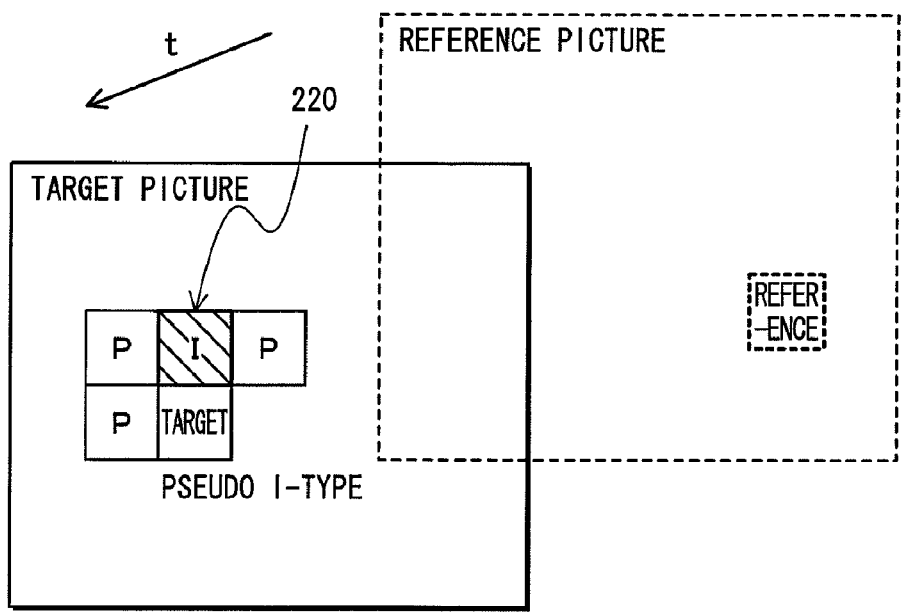
Figure 7:
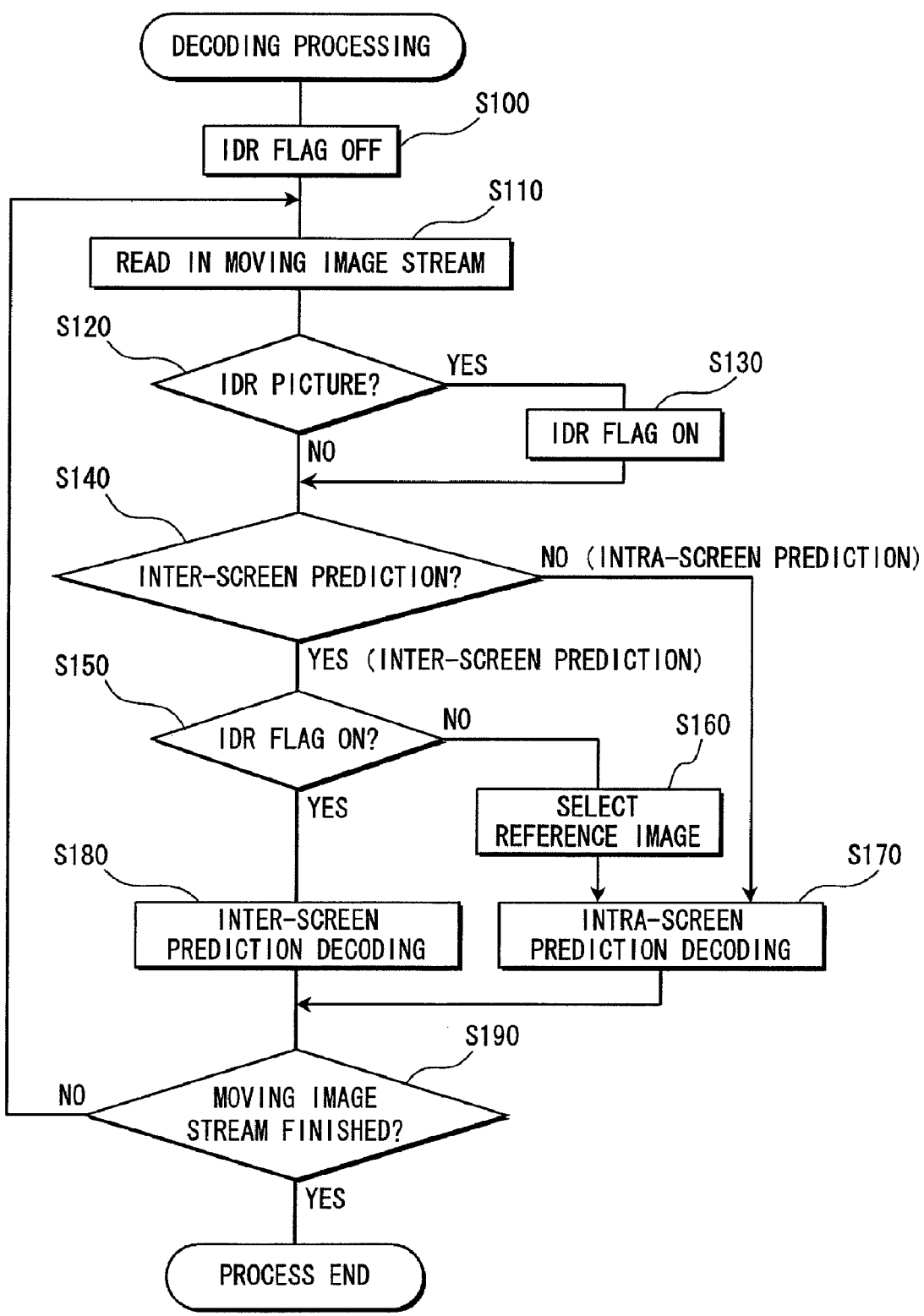
FIG. 7 is a flowchart showing processing for decoding a target block of Embodiment 1.

The following describes the operations of the moving image decoding device 10 of the present invention with reference to FIGS. 6 and 7.

FIG. 6 shows an outline of decoding processing performed in the present Embodiment.

Described below is decoding of a target block 210 within a target picture 200.

The target block 210 is a P-type block, i.e., a block that has been encoded by the inter-screen predictive encoding. The target block 210 is supposed to refer to a reference block 310 within a reference picture 300 (see the drawing above the outlined arrow).

In general, when there exists no reference picture 300, the target block 210 cannot be decoded.

In view of the above, the present Embodiment decodes the target block 210 assuming that the target block 210 has been encoded by the intra-screen encoding (see the drawing below the outlined arrow).

Here, the moving image decoding device 10 first selects, from among the four blocks that could be referred to when performing the intra-screen encoding (see FIG. 4), at least one block that is presumed to be most credible than the rest (i.e., at least one block that is considered to have the highest reproducibility of all), and then decodes the target block 210 by using the selected at least one block as a reference block.

It is assumed in the present Embodiment that the I-type block has the highest reproducibility, followed by the P-type block and the B-type block. This is because the I-type block is of either a non-reference type or an intra-screen prediction type, and the I-type block has a greater chance of being highly reproducible than the P- and B-type blocks that each require a reference image to be decoded. Especially, the more I-type blocks the target picture has, and the more I-type blocks that are positioned in the upper part of the screen, the higher the reproducibility of each I-type block becomes.

In decoding the target block 210, a prediction mode is specified according to the location of the reference block (see FIG. 5). For example, when a block 220 located above the target block 210 is regarded as the reference block, the prediction mode 0 is specified. When the two reference blocks, i.e., the block 220 located above the target block 210 and a block located to the upper left of the target block 210, are regarded as the reference blocks, the prediction mode 5 is specified.

Below is a description of decoding processing with reference to FIG. 7. FIG. 7 is a flowchart showing processing for decoding the target block.

This processing is controlled by the decode control unit 6000.

First, it is assumed that the IDR flag 7000 is set to "OFF" before reading in the moving image stream (Step S100).

The variable-length decoding unit 1000 reads in the moving image stream, decodes the moving image stream by the variable-length decoding, and outputs picture header information and the like to the decode control unit 6000.

Upon receiving the picture header information and the like (Step S110), the decode control unit 6000 judges whether or not the received picture is an IDR picture (Step S120).

When the received picture is the IDR picture (the YES branch of Step S120), the IDR flag 7000 is set to "ON". When the received picture is not the IDR picture (the NO branch of Step S120), the IDR flag 7000 remains as is.

Next, the decode control unit 6000 judges whether or not the target block has been encoded by the inter-screen predictive encoding or the intra-screen predictive encoding (Step S140). When the target block has been encoded by the intra-screen predictive encoding (the NO branch of Step S140), the decode control unit 6000 causes the intra-screen predicted block generation unit 8000 to generate a predicted block in a normal manner (Step S170).

When the target block has been encoded by the inter-screen predictive encoding (the YES branch of Step S140), the decode control unit 6000 requests the predicted block selection subunit 6200 to judge whether or not to allow the inter-screen predicted block generation unit 9000 to generate a predicted block.

Upon receiving the stated request, the predicted block selection subunit 6200 judges that the inter-screen predicted block generation unit 9000 should generate the predicted block when the IDR flag 7000 is "ON" (the YES branch of Step S150), and returns this judgment to the decode control unit 6000.

Accordingly, the decode control unit 6000 causes the inter-screen predicted block generation unit 9000 to generate the predicted block (Step S180).

On the other hand, the predicted block selection subunit 6200 judges that the intra-screen predicted block generation unit 8000 should generate a predicted block when the IDR flag 7000 is "OFF" (the NO branch of Step S150), and returns this judgment to the decode control unit 6000.

Accordingly, the decode control unit 6000 requests the reference image selection subunit 6100 to select the most appropriate reference image.

Upon receiving the stated request, the reference image selection subunit 6100 selects the most appropriate reference block from among blocks that are adjacent to the target block, and returns the selected, most appropriate reference block to the decode control unit 6000 (Step S160).

The decode control unit 6000 specifies a prediction mode according to the received, most appropriate reference block, and causes the intra-screen predicted block generation unit 8000 to generate a predicted block (Step S170).

Thereafter, the decode control unit 6000 repeats the decoding processing (Steps S110 to S180) until the moving image stream is finished (Step S190).

<Variation 1>

According to Embodiment 1, in a case where the target block has been encoded by the inter-screen predictive encoding, if the IDR flag is "OFF" (i.e., if the IDR picture has not been decoded), then said target block will be, without exception, decoded by the intra-screen predictive decoding but not to the inter-screen predictive decoding. As opposed to this, the present Variation allows decoding said target block by the inter-screen predictive decoding if the reference block has been decoded.

Figure 8:
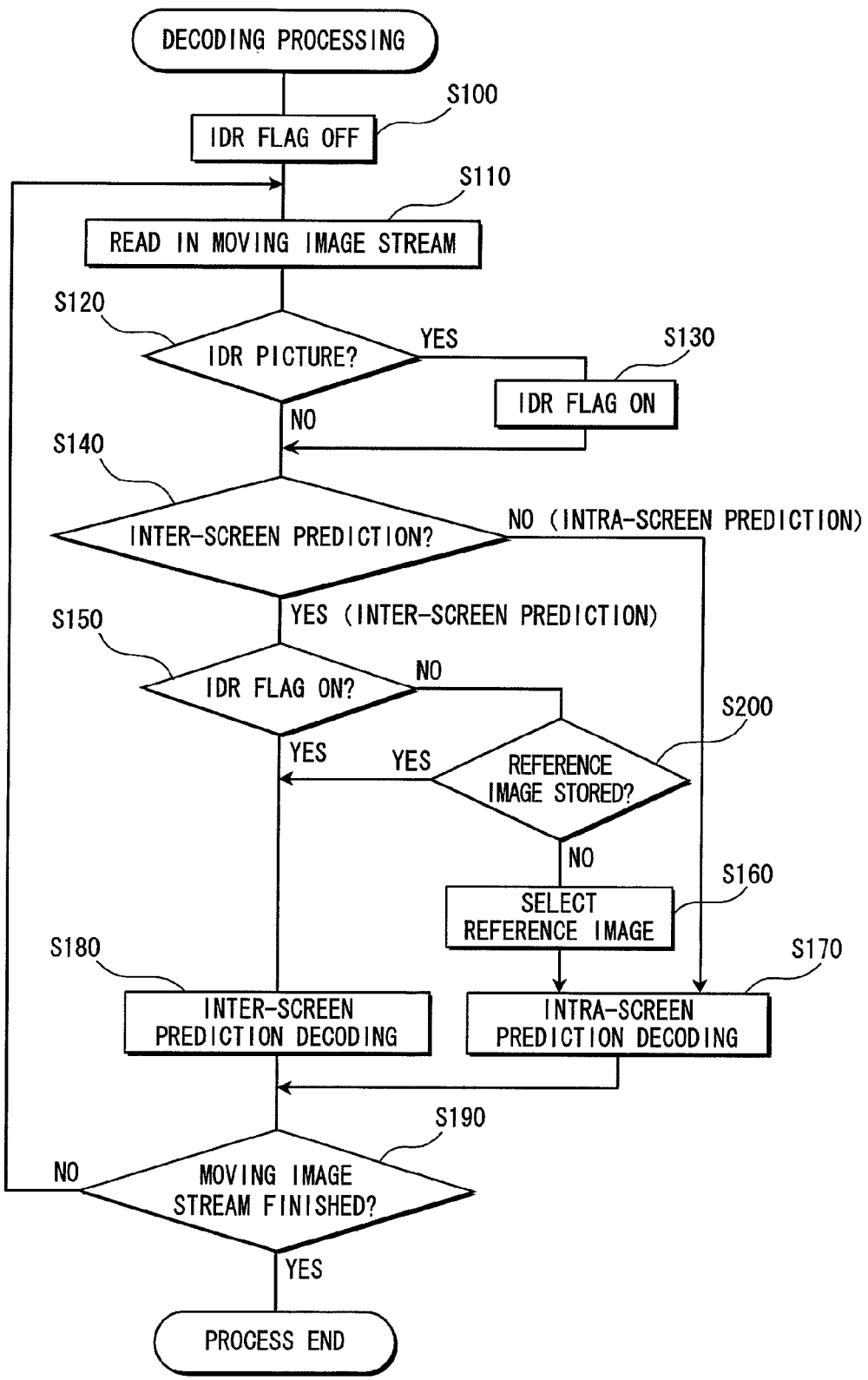
FIG. 8 is a flowchart showing processing for decoding the target block of Variation 1.

With reference to FIG. 8, the following describes decoding processing performed in the present Variation. FIG. 8 is a flowchart showing processing for decoding the target block.

The decoding processing of FIG. 8 is fundamentally the same as the decoding processing of FIG. 7. The only difference is that Step S200 is added to the decoding processing of FIG. 8.

When the IDR flag is "OFF" (the NO branch of Step S150), the predicted block selection subunit further judges whether or not the original reference image that the target block was originally supposed to refer to is stored in the frame memory. When judging that the original reference image is stored (the YES branch of Step S200), the predicted block selection subunit judges that the inter-screen predicted block generation unit 9000 should generate a predicted block, and returns this judgment to the decode control unit 6000. Accordingly, the decode control unit 6000 causes the inter-screen predicted block generation unit 9000 to generate the predicted block (Step S180).

When judging that the original reference image is not stored in the frame memory (the NO branch of Step S200), the predicted block selection subunit judges that the intra-screen predicted block generation unit 8000 should generate a predicted block, and reruns this judgment to the decode control unit 6000.

Accordingly, the decode control unit 6000 causes the reference image selection subunit 6100 to select the most appropriate reference image (Step S160), and causes the intra-screen predicted block generation unit 8000 to generate the predicted block (Step S170).

<Variation 2>

According to Embodiment 1, when performing the intra-screen predictive decoding on the target block that has been encoded by the inter-screen predictive encoding, a reference block is selected from among the blocks that are adjacent to the target block according to a block type thereof. As opposed to this, in the present Variation, at least one reference block is selected according to the degree of reproducibility thereof.

Below is the description of the present variation with reference to FIG. 9.

Figure 9:
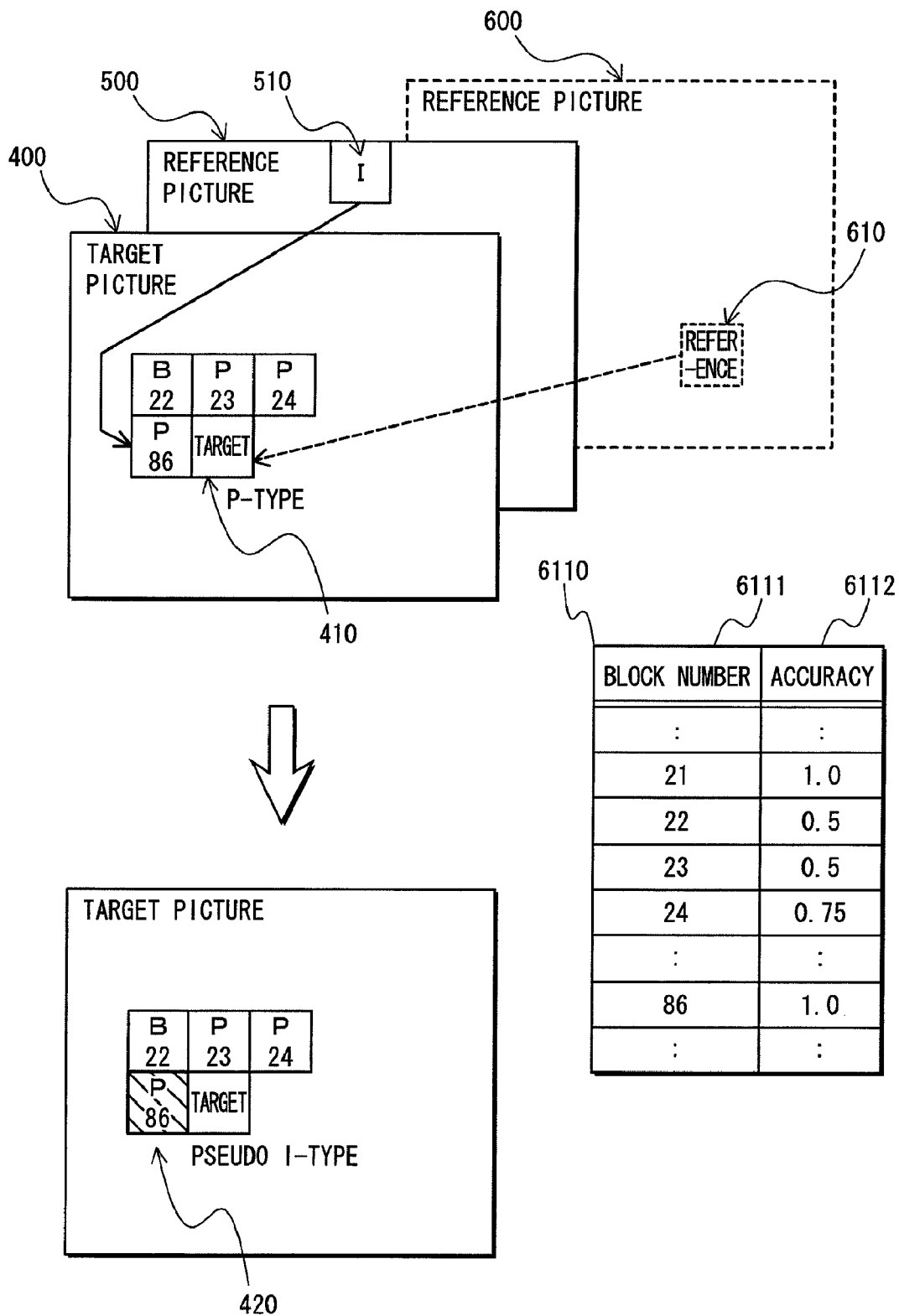
FIG. 9 shows an outline of decoding processing performed in Variation 2.

FIG. 9 shows an outline of decoding processing performed in the present Variation.

The decoding processing of FIG. 9 is fundamentally the same as the flowchart shown in FIG. 7. The only difference is that the processing for selecting a reference image (Step S160 of FIG. 7), i.e., the processing performed by the reference image selection subunit 6100, is different between FIGS. 7 and 9. In the following description, emphasis is placed upon processing performed by the reference image selection subunit 6100.

FIG. 9 depicts decoding of a target block 410 within a target picture 400.

The target block 410 is of a P-type and is supposed to refer to a reference block 610 within a reference picture 600 (see the drawing above the outlined arrow). "B", "P" or the like shown in the reference blocks indicate block types. "22", "23" or the like shown in the reference blocks indicate block numbers.

Since there exists no reference picture 600, the target block 410 is decoded assuming that the target block 410 has been encoded by the intra-screen encoding (see the drawing below the outlined arrow).

Here, the reference image selection subunit 6100 selects a reference block from among blocks that are adjacent to the target block 410 (see Step S160 or the like in FIG. 7).

In the present Variation, in order to select the reference block, the reference image selection subunit 6100 refers to a block accuracy table 6110 that is stored in internal memory of the decode control unit 6000.

The block accuracy table 6110 includes a block number 6111 and accuracy 6112, the former showing identifiers of the blocks and the latter showing the degrees of reproducibilities of the blocks.

The block accuracy table 6110 is generated by the decode control unit 6000 and includes a block number and accuracy of each block included in the target picture. Each accuracy 6112 is determined in accordance with a type and a reference block of the corresponding one of the blocks. For example, an accuracy 6112 of a block of an I-type and a non-reference type is "1.0", and an accuracy 6112 of a P-type block whose reference block has not been decoded is "0.75". When an accuracy 6112 of the reference block is "0.75", an accuracy 6112 of the target block is determined to be "0.5".

In FIG. 9, from among the four blocks that are adjacent to the target block 410 (i.e., the four blocks whose block numbers are "22", "23", "24" and "86"), a block with a block number "86", which holds the highest accuracy 6112 of all, is selected.

<Embodiment 2>

<Overview>

Embodiment 1 has described the moving image decoding device of the present invention. The present Embodiment will illustrate an example of a digital television that employs this moving image decoding device.

<Functions>

Figure 10:
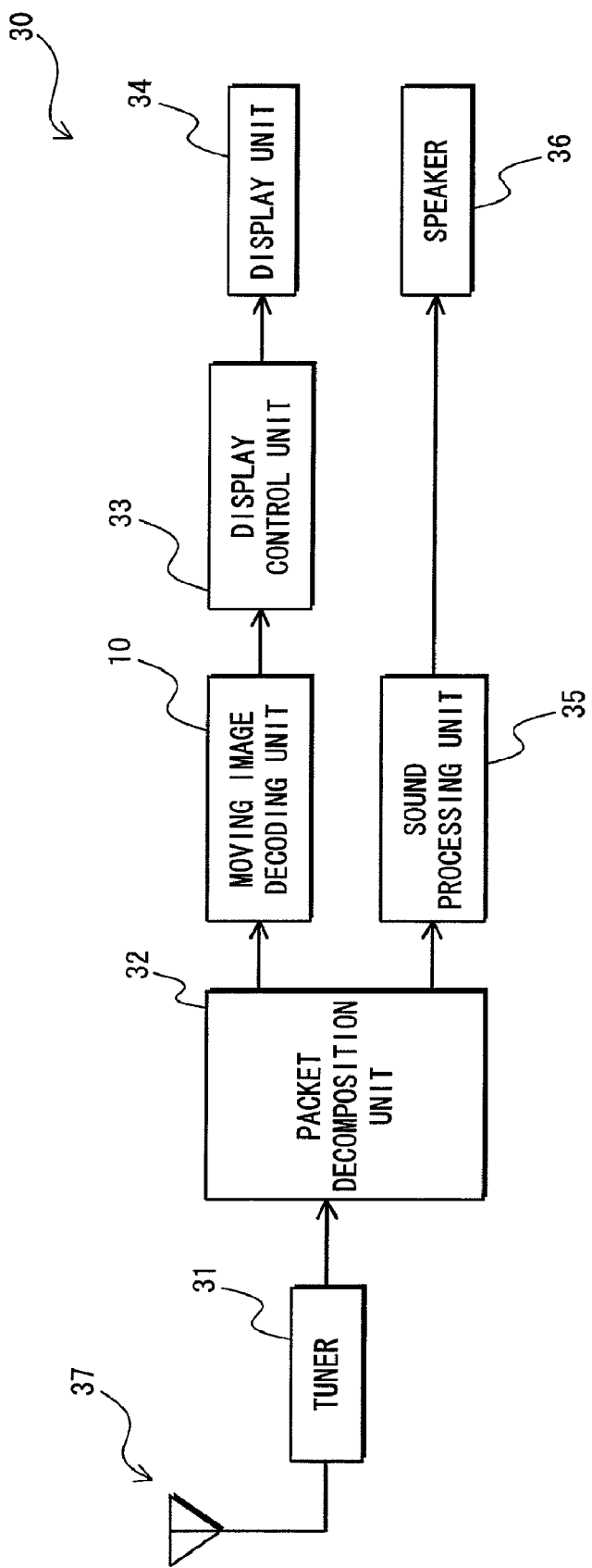
FIG. 10 is a block diagram showing a part of a digital television pertaining to the present invention.

FIG. 10 is a block diagram showing a part of a digital television pertaining to the present invention.

A digital television 30 is composed of: an antenna 37; a tuner 31; a packet decomposition unit 32; a moving image decoding unit 10; a display control unit 33; a display unit 34; a sound processing unit 35; and a speaker 36.

First, the tuner 31 selects a station for a broadcast wave received from the antenna 37, demodulates the broadcast wave, and generates packets.

The packet decomposition unit 32 analyzes a header of each packet, and categorizes each packet into a moving image decoding packet or a sound decoding packet, and outputs the moving image decoding packets and the sound decoding packets to the moving image decoding unit 10 and the sound processing unit 35, respectively.

The structure of the moving image decoding unit 10 is similar to that of the moving image decoding device described in the Embodiment 1.

In order to display a decoded image, the display control unit 33 performs format conversion, filtering processing or the like, and controls the display unit 34. The display unit 34 displays, onto a liquid crystal display or the like, an image that has been input thereto.

With reference to FIG. 3, the following describes operations of the digital television pertaining to Embodiment 2 of the present invention.

<Operations>

The tuner 31 selects a station for a broadcast wave received from the antenna 31, decodes the broadcast wave, then outputs packets that each store therein moving image, sound, or the like to the packet decomposition unit 32. Based on the result of analyzing the header of each packet, the packet decomposition unit 32 outputs data of the moving image decoding packets and the sound decoding packets to appropriate destinations.

Here, moving image data, i.e., a moving image stream, is output to and decoded by the moving image decoding unit 10. The decoded image is output to the display control unit 33.

After subjecting the decoded image to the image format conversion, the filtering processing or the like, the display control unit 33 displays the decoded moving image onto the display unit 34.

Meanwhile, sound data is output to the sound processing unit 35. The sound processing unit 35 then converts the sound data into a sound signal by subjecting the sound data to sound decoding processing. The speaker 36 provides the sound signal to an audience of the television by outputting the sound signal in the form of sound.

As stated above, because the moving image decoding unit 10 can decode a moving image sequence from a picture provided in the mid-point of the moving image sequence, the digital television of the present invention can shorten the time required to change an image display in switching channels.

[Additional Remarks]

The foregoing has explained Embodiments of the present invention. However, the present invention is not limited to the above Embodiments, and may instead be implemented in the following manners.

(1) According to the above Embodiments, a reference image is selected in performing the intra-screen predictive encoding. However, the reference image may be a fixed reference image.

For example, a block located above the target block may always be a reference block. Such a reference block may hold a lower degree of reproducibility, but this method has the benefit of decreasing the processing load.

(2) In Embodiment 2, the tuner 31 is provided as a reception unit to receive packets, including television signals. However, The tuner 31 may be replaced by a network connection unit for receiving packets via a network.

(3) The above Embodiments have described a case where the moving image data, which has been generated in conformity with the H.264/MPEG-4 AVC standard, is decoded from the mid-point of its sequence. However, it is also possible to decode moving image data that has been generated in conformity with any other standard.

For example, in a case where moving image data has been generated in conformity with the MPEG-2 standard, this moving image data should be decoded from the mid-point of GOP (Group of Pictures). In this case, a flag equivalent to the IDR flag detects a start code indicating the start of GOP and is set to "ON" or "OFF" accordingly.

(4) The moving image decoding device may realize all or a part of each constituent element shown in FIG. 1 as a single integrated circuit chip or a plurality of integrated circuit chips.

(5) The moving image decoding device may realize all or a part of each constituent element shown in FIG. 1 as a computer program. The moving image decoding device may realize said each constituent element in any other way.

When the constituent elements of FIG. 1 are realized as a computer program, the computer program may be executed by making a computer read in the content that has been written into a recording medium, such as a memory card and a CD-ROM. Or, it is also possible to execute the computer program by downloading the program via a network.

<Conventional Decoding Device and Problems Thereof>

Although not intended to address failures in the reference relationships of the inter-screen prediction pertaining to the present invention, there exists a technology that can perform the following: detecting an error in a moving image stream; generating two predicted blocks that have been respectively predicted by the intra-screen prediction and the inter-screen prediction, so as to conceal a block that is supposed to be decoded but cannot be decoded due to the error; and selecting the proper one of the two generated predicted blocks as a decoded block (See Patent Document 2).

The following is a brief description of the above-mentioned technology.

Figure 11:
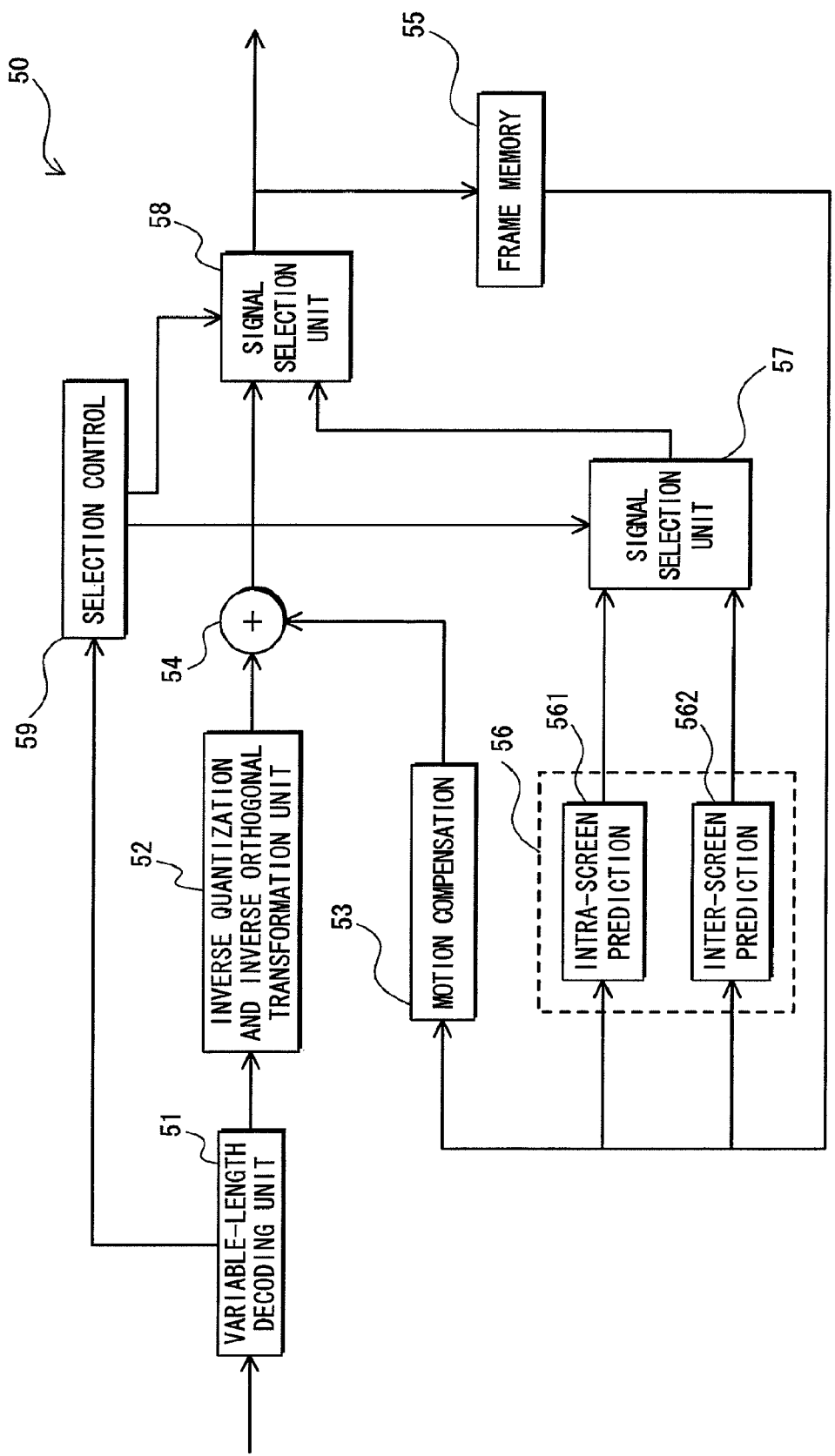
FIG. 11 is a block diagram showing the structure of a conventional moving image decoding device 50.

FIG. 11 is a block diagram showing the structure of a conventional moving image decoding device 50 pertaining to the above-mentioned Patent Document 2.

Referring to FIG. 11, a variable-length decoding unit 51 obtains a quantized conversion coefficient by decoding a moving image stream that has been input thereto by variable-length decoding.

An inverse quantization and inverse orthogonal transformation unit 52 obtains pixel residuals by subjecting the quantized conversion coefficient to inverse quantization and inverse conversion.

A motion compensation unit 53 obtains a reference frame and a motion vector from the variable-length decoding unit 51, reads out a pixel value of the reference block from frame memory 55, additionally performs predetermined processing on the predicted block, and then outputs the predicted block.

A reconstruction unit 54 outputs a decoded image, which has been reconstructed by adding (i) a residual signal output from the inverse quantization and inverse orthogonal transformation unit 52 and (ii) the predicted block output from the motion compensation unit 53.

The frame memory 55 stores therein (i) a decoded image of the current frame and (ii) a pixel value of an already decoded frame that has been decoded before and is going to be referred to.

When an error is detected in the variable-length decoding unit 51, a concealment unit 56 generates a replacement block for concealing a block that was supposed to be decoded but could not be decoded due to the error.

The concealment unit 56 includes an intra-screen prediction subunit 561 that performs intra-screen prediction and an inter-screen prediction subunit 562 that performs inter-screen prediction.

A first signal selection unit 57 selects one of an intra-screen predicted block and an inter-screen predicted block that have been output by the concealment unit 56, and outputs the selected one of the predicted blocks as the replacement block.

A second signal selection unit 58 selects one of the replacement block output by the first signal selection unit 57 and the decoded image output by the reconstruction unit 54.

In response to an error detection signal output from the variable-length decoding unit 51, a selection control unit 59 controls signal selections performed by the first signal selection unit 57 and the second signal selection unit 58.

As set forth, the conventional moving image decoding device pertaining to the Patent Document 2 is basically structured in such a manner that it detects an error in the moving image stream and outputs a replacement block, which is generated by the concealment unit 56 and the first signal selection unit 57, as a decoded image.

Assuming that the error is detected when there exists no reference frame in the course of decoding the moving image stream from the mid-point of its sequence, the above-mentioned technology would presumably select the predicted block that has been obtained by performing intra-screen prediction as the replacement block, with the result that the predicted image would be the decoded image as is. However, as discussed earlier, this raises the following problem: residual data obtained from a quantized conversion coefficient is left unutilized.

The present invention can be applied to an audio visual device that performs processing for decoding a moving image.

The invention claimed is:

1. A moving picture decoding device for decoding moving picture data encoded by a predictive encoding method, the moving picture data being composed of a plurality of pictures that each include blocks, each block including (i) information indicating a reference picture that is referred to in generating a predicted image of the block, and (ii) residual data indicating a difference between a pre-encoding image of the block and the predicted image of the block, the moving picture decoding device comprising:

a storage unit operable to store therein pictures obtained by decoding the blocks;

a judgment unit operable to judge whether or not the reference picture associated with a target block to be decoded has already been decoded and stored in the storage unit, the reference picture associated with the target block being referred to in encoding the target block, the target block being one of the blocks; and a control unit operable to, in a case where the target block has been encoded by an inter-picture predictive encoding method, perform control for: (i) when the judgment unit judges affirmatively, generating the predicted image of the target block using the reference picture associated with the target block, and decoding the target block using the generated predicted image of the target block and the residual data of the target block; and (ii) when the judgment unit judges negatively, generating the predicted image of the target block using an image of at least one of the blocks that is included in the same picture with the target block and has already been decoded, and decoding the target block using the generated predicted image of the target block and the residual data of the target block.

2. The moving picture decoding device of claim 1, further comprising:
a detection unit operable to detect that a predetermined one of the pictures has been decoded, wherein
until the detection unit detects that the predetermined one of the pictures has been decoded, the judgment unit judges negatively.

3. The moving picture decoding device of claim 1, wherein
in the case where the target block has been encoded by the inter-picture predictive encoding method, when the judgment unit judges negatively, the control unit performs control for (i) selecting, from among one or more blocks adjacent to the target block, at least one block encoded by an intra-picture predictive encoding method, (ii) generating the predicted image of the target block using at least one image obtained by decoding the selected at least one block, and (iii) decoding the target block using the generated predicted image of the target block and the residual data of the target block.

4. The moving picture decoding device of claim 1, further comprising:
a correlation storage unit operable to store therein, in one-to-one correspondence with images obtained by decoding the blocks, correlation information pieces each indicating a degree of similarity between the pre-encoding image of the corresponding block and an image obtained by decoding the corresponding block, wherein
in the case where the target block has been encoded by the inter-screen predictive encoding method, when the judgment unit judges negatively, the control unit performs control for (i) in accordance with the correlation information pieces, selecting, from among one or more images obtained by decoding one or more blocks adjacent to the target block, the image having a higher degree of similarity to the corresponding pre-encoding image than the rest, (ii) generating the predicted image for the target block using the selected image, and (iii) decoding the target block using the generated predicted image of the target block and the residual data of the target block.

5. A moving picture decoding method used in a moving picture decoding device for decoding moving picture data encoded by a predictive encoding method, the moving picture data being composed of a plurality of pictures that each include blocks, each block including (i) information indicating a reference picture that is referred to in generating a predicted image of the block, and (ii) residual data indicating a difference between a pre-encoding image of the block and the predicted image of the block, the moving picture decoding method comprising the steps of:
storing, in memory, pictures obtained by decoding the blocks;
judging whether or not the reference picture associated with a target block to be decoded has already been decoded and stored in the storage unit, the reference picture associated with the target block being referred to in encoding the target block, the target block being one of the blocks; and
in a case where the target block has been encoded by an inter-picture predictive encoding method, performing control for: (i) when the judging step judges affirmatively, generating the predicted image of the target block using the reference picture associated with the target block, and decoding the target block using the generated predicted image of the target block and the residual data of the target block; and (ii) when the judging step judges negatively, generating the predicted image of the target block using an image of at least one of the blocks that is included in the same picture with the target block and has already been decoded, and decoding the target block using the generated predicted image of the target block and the residual data of the target block.

* * * * *